United States Patent
Takemoto (10) Patent No.: US 6,757,075 B1
(45) Date of Patent: Jun. 29, 2004

(54) IMAGE FORMING DEVICE AND RECORDING MEDIUM STORING PROGRAM

(75) Inventor: Hitoshi Takemoto, Niigata (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/532,662

(22) Filed: Mar. 21, 2000

(30) Foreign Application Priority Data

Mar. 26, 1999 (JP) .................................. 11-084406/1999

(51) Int. Cl.[7] .......................... H04N 1/32; H04N 1/04; G06F 1/15; B41J 2/47; G06K 9/34
(52) U.S. Cl. ...................... 358/1.7; 358/486; 347/238; 347/129; 382/173
(58) Field of Search ................................ 358/408, 474, 358/486–489, 518, 426.13, 2.99, 296; 347/129, 239, 233, 238; 382/173

(56) References Cited

U.S. PATENT DOCUMENTS

| | | | | |
|---|---|---|---|---|
| 5,588,072 A | * | 12/1996 | Wang | 382/176 |
| 5,790,165 A | * | 8/1998 | Kuboki et al. | 347/257 |
| 6,015,385 A | * | 1/2000 | Finger et al. | 600/443 |
| 6,038,342 A | * | 3/2000 | Bernzott et al. | 382/173 |
| 6,181,825 B1 | * | 1/2001 | Ragland et al. | 382/239 |
| 6,522,350 B2 | * | 2/2003 | Inoue et al. | 347/238 |
| 6,631,207 B2 | * | 10/2003 | Hirota et al. | 382/167 |

* cited by examiner

*Primary Examiner*—Kimberly Williams
*Assistant Examiner*—Saeid Ebrahimi
(74) *Attorney, Agent, or Firm*—Dickstein, Shapiro, Morin & Oshinsky, LLP.

(57) ABSTRACT

The image forming device has a recording unit which records an image data line by line while scanning a recording medium with a laser; a memory circuit for storing the image data corresponding to a plurality of lines of the image data; an operation circuit for dividing the image data stored in the memory circuit per line into blocks and generating an image data block having the number of pixels corresponding to an amount of skew with respect to a main scan line direction of the laser from the recording unit; and a control circuit for selecting pixel data from the image data block in corresponding two blocks of the adjacent two lines and combining the image data block and the selected pixel data to produce a line data to be supplied to the recording unit.

9 Claims, 7 Drawing Sheets

IMAGE FORMING DEVICE AND RECORDING MEDIUM STORING PROGRAM

BACKGROUND OF THE INVENTION

1. Field of the Invention

The present invention relates to an image forming device such as printer, facsimile device or copier, which utilizes electrophotography, and a recording medium storing a program used in such image forming device.

2. Description of the Related Art

In a conventional printer using electrophotography, a photoconductor is exposed based upon image data and a latent image is formed. For exposure, a laser unit that irradiates a laser beam is often used. The above laser unit is acquired by integrating a laser and an optical system for focusing a laser beam from the laser on the photoconductor. For example, the laser unit is constructed by a laser diode array or by another laser unit having a polygon mirror for scanning a laser beam from a laser radiating apparatus.

The laser unit has to be mounted on the printer so that a scanning direction of the laser beam generated from the laser unit is in parallel to a main scanning direction of the photo-conductor. But, when the laser unit is mounted on the printer with the scanning direction thereof being in not parallel to the main scanning direction of the photo-conductor, it is impossible to generate a correct image data on the photoconductor.

Figure 1:
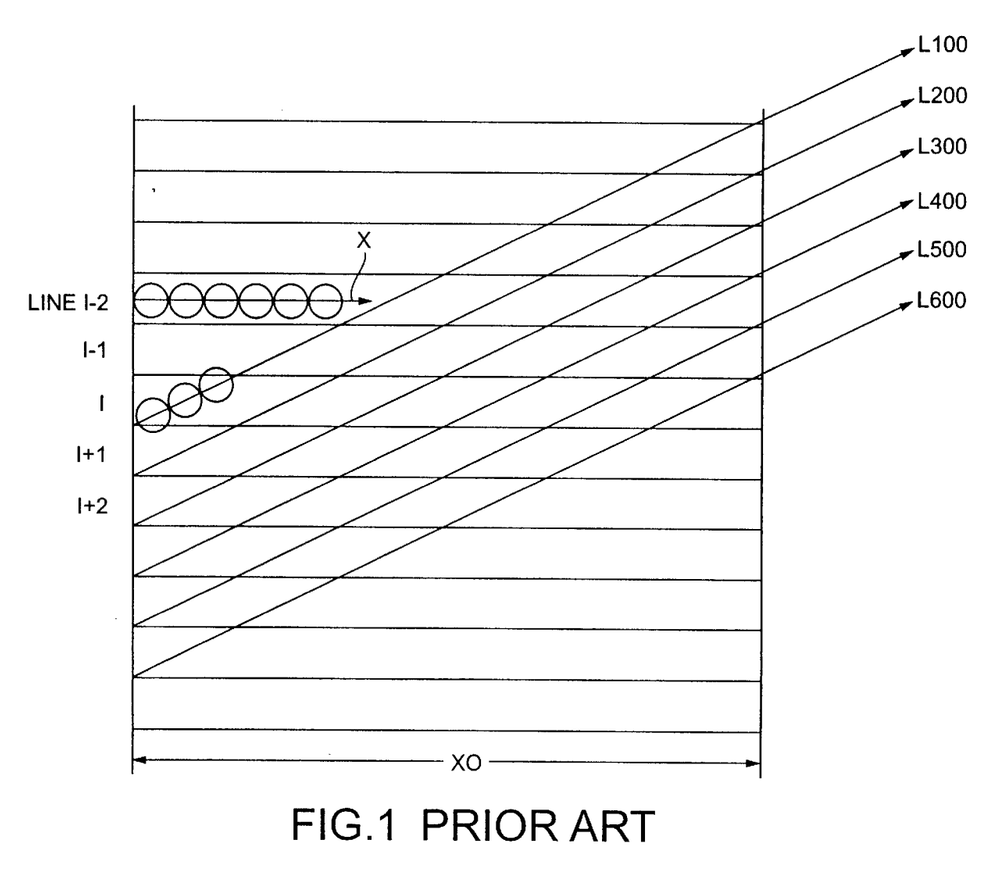
FIG. 1 is a diagram for explaining a laser scanning condition of a laser unit used in a conventional image forming device, which is installed in a condition skewing in a right-handed upward direction with respect to a horizontal scanning direction of a photoconductor.

FIG. 1 shows a case that a laser unit is installed in a condition such that the laser beam skews in a right-handed upward direction with respect to a horizontal scanning direction of a photoconductor. The arrows L100 to L600 show a laser scanning direction in which image data is output. Assuming that a scanning width in a horizontal direction (main scanning direction) X is X0, and a right-hand upward direction with respect to the horizontal direction X is a positive skew direction and a right-hand downward direction with respect to the horizontal direction is a negative skew direction. In this case, FIG. 1 shows that image data is output on printing paper with the image data skewed by '+5' lines within the main scanning width X0. If the laser unit is mounted on the printer with the scanning direction thereof being in parallel to the main scanning direction X of the photo-conductor, as shown in line I-2 in FIG. 1, the image data is not skewed.

However, in the above example of the conventional type, the larger the quantity of skew is, the worse the quality of printing of an output result becomes. Therefore, it can be said that the degree of skew has an effect upon the performance of a printer. Also, when a laser unit is installed, it is required to be precisely assembled to reduce the quantity of skew. Therefore, a problem that the manpower of the assembly is remarkably increased, a fixture and others are required to be produced and the price of a printer rises occurs.

SUMMARY OF THE INVENTION

An object of the present invention is to provide a method for correcting an image data with high precision.

Another object of the present invention is to provide a recording medium storing a program for executing a procedure of dividing lines of an image data to blocks.

In order to achieve the above objects, an image forming device according to the present invention has a recording unit which records an image data line by line while scanning a recording medium with a laser; a memory circuit for storing the image data corresponding to a plurality of lines of the image data; an operation circuit for dividing the image data stored in the memory circuit per line into blocks and generating an image data block having the number of pixels corresponding to an amount of skew with respect to a main scan line direction of the laser from the recording unit; and a control circuit for selecting pixel data from the image data block in corresponding two blocks of the adjacent two lines and combining the image data block and the selected pixel data to produce a line data to be supplied to the recording unit.

A scan speed of the recording unit in the main scan line direction may be made twice that of a usual scan speed or a relative scan speed of the recording unit to the recording medium in a sub scan line direction may be made a half that of a usual case when the skew is not generated.

The recording unit may be a laser beam irradiation device and the recording medium may be a photo-conductor scanned by a laser beam from the recording unit.

The image forming device may further has a measuring unit for measuring the amount of tilting.

Further, a recording medium according to the present invention stores a program for executing a procedure of; dividing an image data stored in a memory circuit per line into blocks and generating an image data block having the number of pixels corresponding to an amount of skew with respect to a main scan line direction of a recording unit; selecting pixel data from the image data block in corresponding two blocks of the adjacent two lines; and combining the image data block and the pixel data to produce a line data to be supplied to the recording unit.

The program may include a sub program for executing a procedure of making a scan speed of the recording unit in the main scan direction twice that of a usual case when the skew is not generated.

The program may include a sub program for executing a procedure of making a relative speed of the recording unit and the recording medium in a sub scan direction a half of that of a usual case.

The program may include a sub program for executing a procedure of measuring a tilting amount of the recording unit in the main scan direction.

DETAILED DESCRIPTION OF THE PREFERRED EMBODIMENTS

The present invention will be described in detail with reference to embodiments shown in the drawings.

Figure 2:
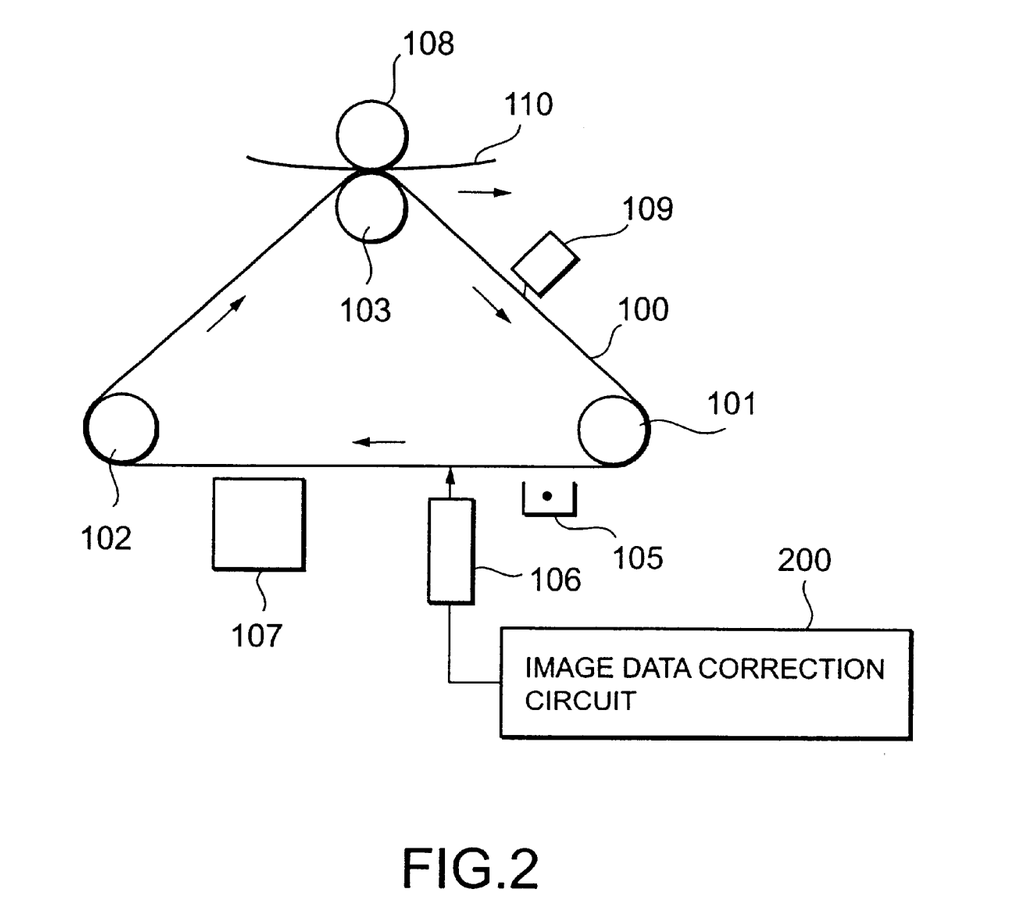
FIG. 2 is a diagram for showing an image forming device according to an embodiment of the present invention.

FIG. 2 is a block diagram showing an image forming device according to an embodiment of the present invention.

In FIG. 2, the image forming device is a electrophotographic printer, which has a photoconductor belt 100. The photoconductor belt 100 is rotated by rollers 101, 102 and 103. An electric charger 105 charges the photoconductor belt 100 to an predetermined charging level. An exposing laser unit 106 exposes the photoconductor belt 100 for forming a latent image. The exposing laser unit 106 is connected to the image data correction circuit 200 of the embodiment according to the present invention. A developer 107 forms a toner image on the photoconductor belt 100 according to the latent image. A transfer roller 108 transfers the toner image to a recording medium 110. A cleaning device 109 cleans the surface of the photoconductor belt 100 for eliminating a remaining toner on the photoconductor belt 100.

Figure 3:
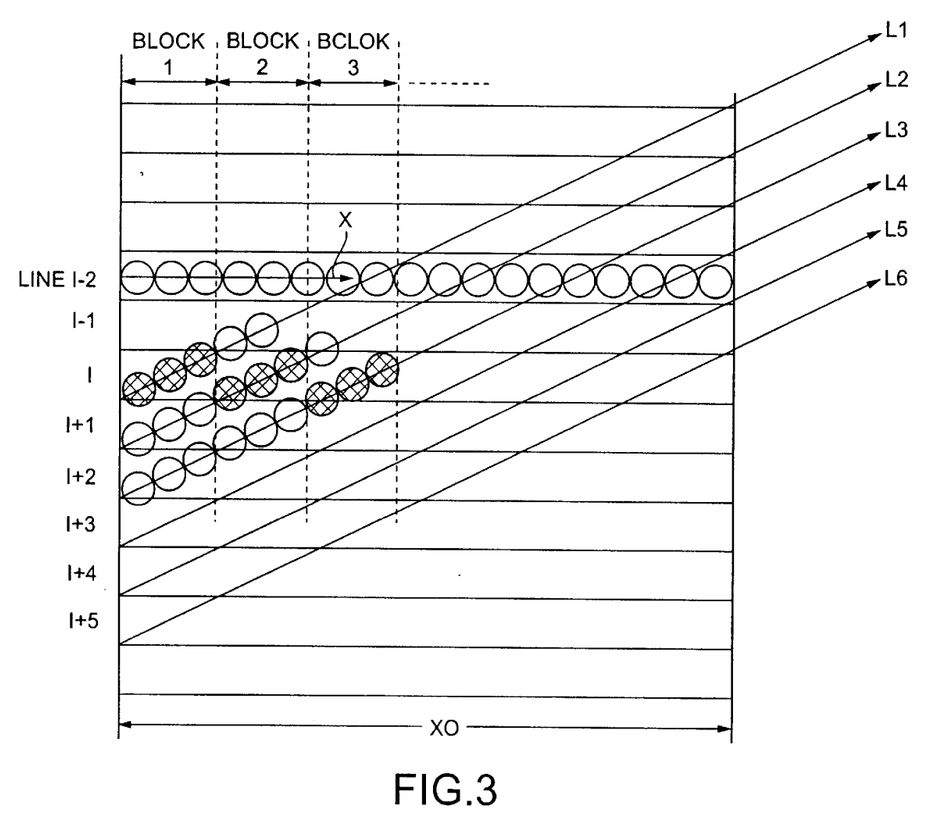
FIG. 3 is a diagram for explaining a laser scanning condition of a laser unit used in an image forming device described in a former US application (application Ser. No. 09/436,005) filed by the applicant on Nov. 9, 1999.

FIG. 3 shows a principle of another image data correction method described in a former US application (application Ser. No. 09/436,005) filed by the applicant of the present application on Nov. 9, 1999.

In FIG. 3, a laser unit (not shown) is installed in a condition skewing in a right-handed upward direction with respect to a desired main scanning direction X on a photoconductor. The arrows L1 to L6 show laser scanning directions and laser beams on the photoconductor. Each of the laser beam is modulated by input image data by every dot or pixel.

Assuming that a scanning width in the desired main scanning direction X is X0, the number of dots in the desired main scanning direction X is 18 (dots/line), and a right-hand upward direction with respect to the desired main scanning direction X is a positive skew direction and a right-hand downward direction with respect to the desired main scanning direction X is a negative skew direction. The laser beams L1 to L6 from the laser unit are skewed by '+5' lines while the laser beam scans on the main scanning width X0 in FIG. 3. If the laser unit (not shown) is mounted on the printer with the laser scanning direction thereof being in parallel to the desired main scanning direction X, as shown in line I-2 in FIG. 1, the image data is not skewed.

To compensate for the influence by the skew of the laser beam (for example, laser beam L1 for the line I), the image data correction circuit described in the former application controls the supply timing of the input image data of the line I, (as shown by net patterned dots). For example, in FIG. 3, the scan area is separated by several blocks at every line, and in a first block 1 on the line I, first three dots (first image data block) are supplied on the laser beam L1, in a second block 2 on the line I, second three dots (second image data block) are supplied on the laser beam L2, in a third block 3 on the line I, third three dots (third image data block) are supplied on the laser beam L3, and so on. Therefore, the dots of the image data for the line I are almost disposed on the line I, as shown by net patterned dots of FIG. 3.

Figure 4:
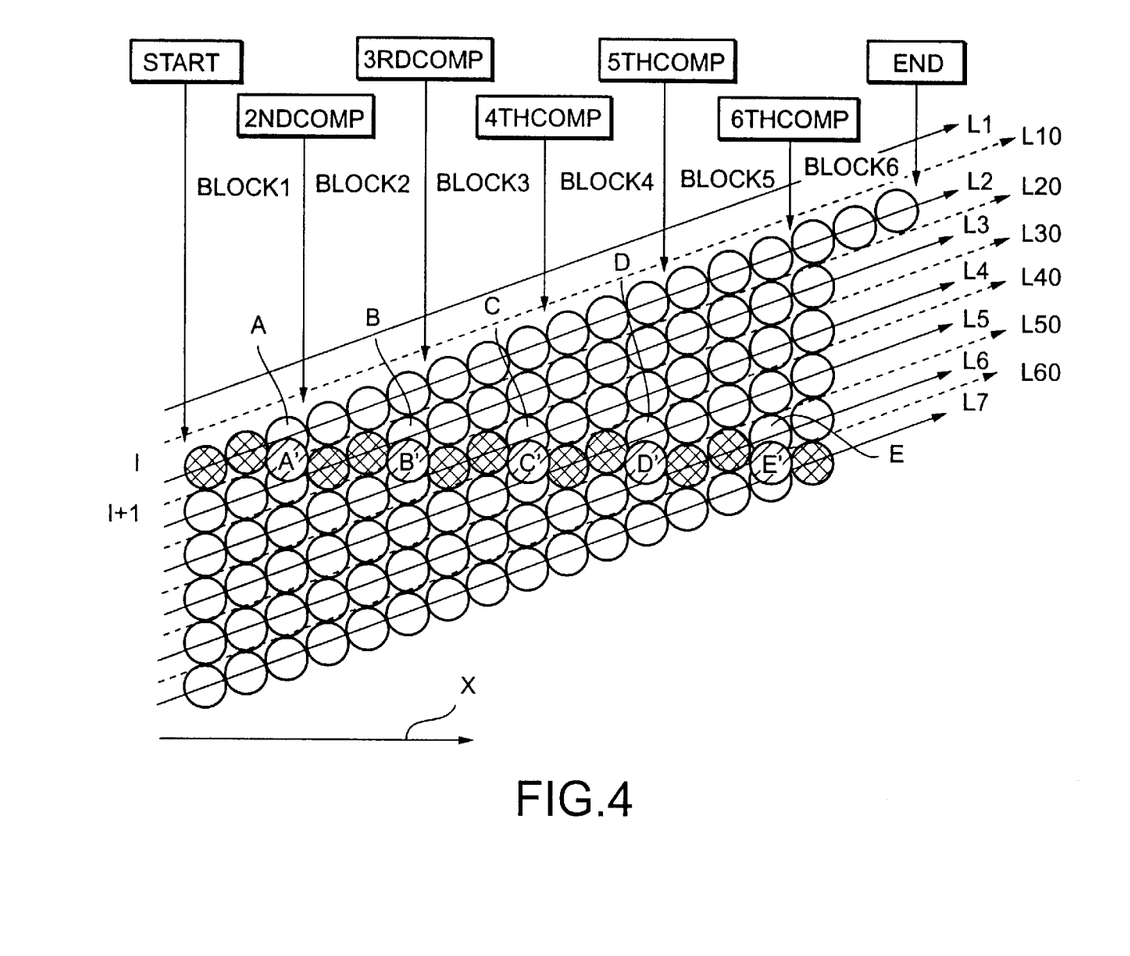
FIG. 4 is a diagram for explaining a laser scanning condition of a laser unit used in an image forming device of the embodiment of the present invention.

The present invention modifies the image data correction method and circuit described in the former application to locate the dots of the image data on the photoconductor as shown in FIG. 4. In FIG. 4, there are 18 dots per line. In the line I, location of one dot (pixel) data (A', B', C', D', E') among the image data block of each block are changed. There are additional laser scanning beams (or lines) L10 to L50 (doted lines) between the two scanning beams, and dots A', B', C', D', E' are supplied on the additional laser beams L20 to L50.

In comparison with FIG. 3, the linearity of the dots on the line I of FIG. 4 is improved.

Figure 5:
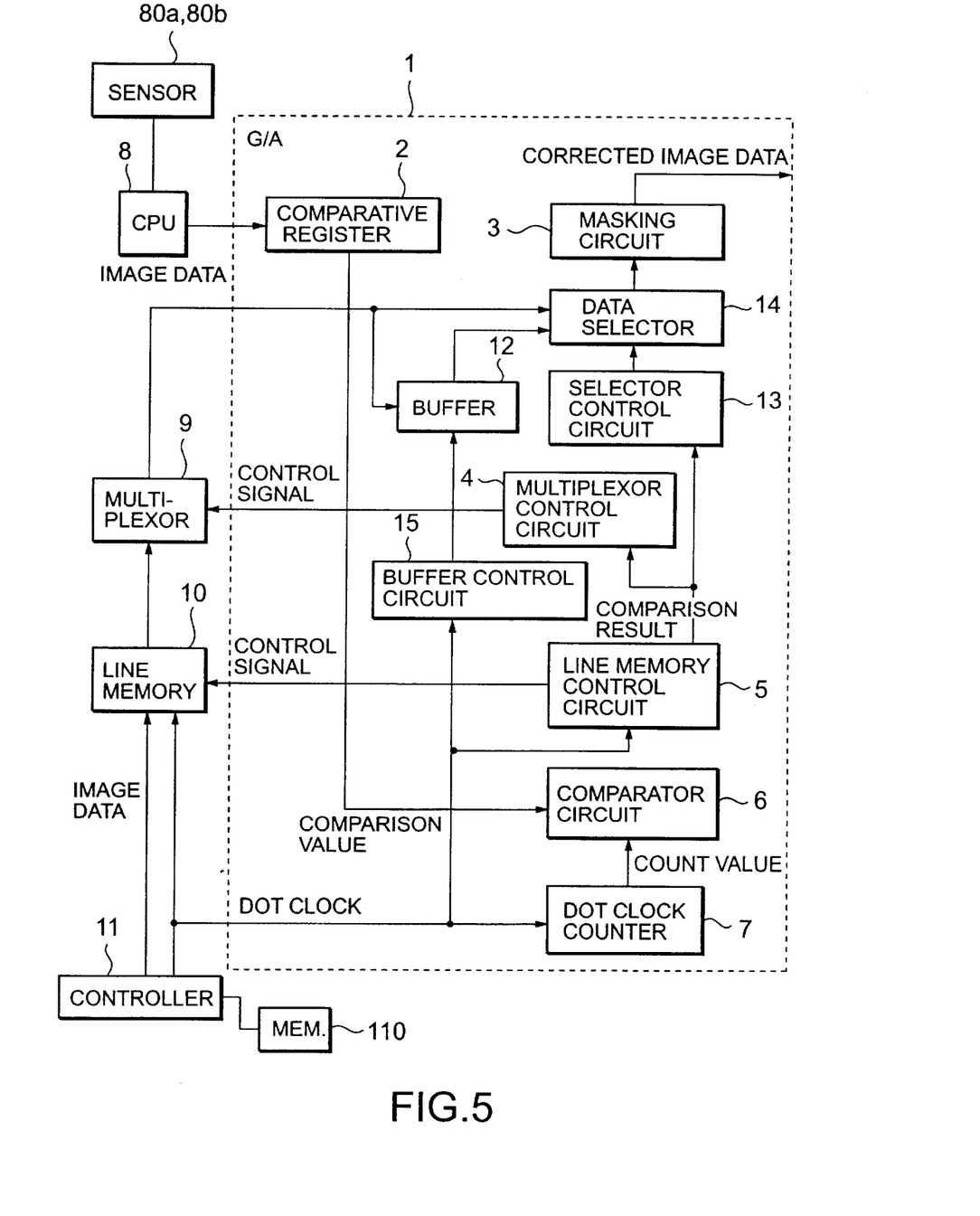
FIG. 5 a block diagram of an image data correction circuit used in the image forming device of FIG. 2.

As shown in FIG. 5, the image data correction circuit 200 in FIG. 2 is composed of a gate array 1, a line memory 10 which can store image data equivalent to a few lines, a multiplexer 9 for selecting and outputting image data read from the line memory 10, and a control circuit (CPU) 8 for controlling the above line memory and multiplexer.

The number of lines of image data stored in the line memory 10 is determined according to the skew corrected quantity. For example, if the laser beam on the photoconductor 100 is skewed in a right-hand upward or downward direction in one scanning and as a result, and the laser beam is skewed by M lines (M: a positive number) in a vertical direction of the laser beam scanning direction, image data for M or more lines are stored in the line memory 10 to correct the skew.

The gate array 1 is composed of a comparative register 2, a masking circuit 3, a multiplexer control circuit 4, a line memory control circuit 5, a comparator circuit 6, a dot clock counter 7, buffer 12, selector control circuit 13 and data selector 14, and the respective circuits are integrated. The multiplexer 9 and the line memory 10 are arranged in the periphery of the gate array 1, respectively receive a control signal from the gate array 1 and image data is corrected and converted.

The image data correction circuit shown in FIG. 5 and the skew quantity correction method are one example of the configuration given for explaining this embodiment. Also, the multiplexer 9 and the line memory 10 can be also integrated in the gate array 1, in that case, the area of the above image data correction conversion circuit can be reduced and the method is effective to miniaturize the image formation device.

Next, how the image data correction circuit and the skew quantity correction method according to the present invention function will be described. First, Sensors 80a and 80b detects a skew and CPU 8 measures the quantity and direction of the skew showing how large the laser beams L10 to L70 (FIG. 4) and the laser scanning direction is declined from the desired (horizontal) scanning direction X. The measurement is initiated according to a signal showing an instruction from a control panel not shown or when the device is powered on.

Figure 6A:
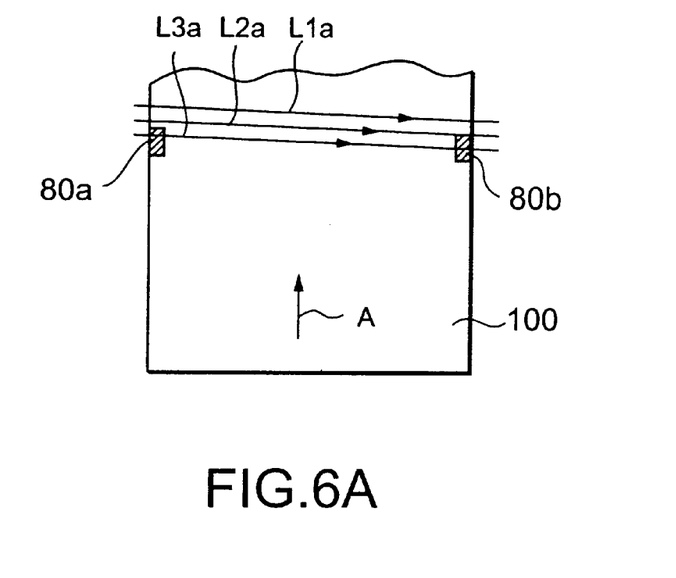
FIGS. 6A and 6B are diagrams showing the skew detection of the embodiment.
Figure 6B:
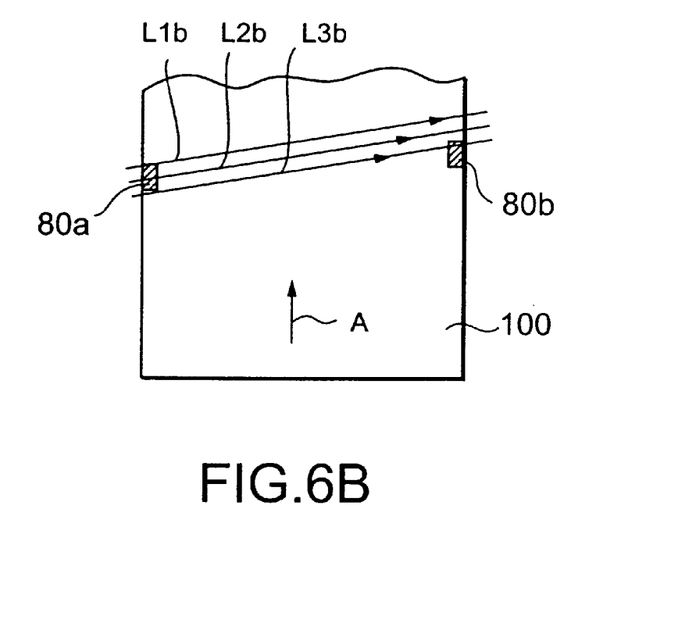

FIGS. 6A and 6B show skew detection by the sensors 80a and 80b. The sensor 80a and 80b are located at the edges of the photocnductor belt 100 and on the reference horizontal scanning line. First, the exposing laser unit 106 scans the laser beam on the sensor 80a and 80b. If horizontal scanning directions of the scanning laser beam is identical with the reference horizontal scanning direction, the sensors 80a and 80b detects the laser beam at the same time; however, if the skew is generated, one of the sensors 80a and 80b does not detected the laser beam.

In FIG. 6A, lines L1a, L2a, L3ca are tracks of first, second, and third laser beams, and the photoconductor belt 100 moves along the allow A. The first laser beam is detected by the sensor 80b, but not detected by the sensor 80a. The second laser beam is also not detected by the sensor 80a. The third laser beam L3a is at last detected by the sensors 8a. In FIG. 6B, lines L1b, L2b, L3b are tracks of first, second, and third laser beams, and the photoconductor belt 100 moves along the allow A. The first laser beam is detected by the sensor 80a, but not detected by the sensor 80b. The second laser beam is also not detected by the sensor 80b. The third laser beam L3a is at last detected by the sensors 8b. Therefore, the quantity of the skew is "2" (that is: the laser beam skews "2" dots in the vertical direction of the laser scanning direction) and the skew directions of FIG. 6A and FIG. 6B are different (In FIG. 6A, the laser beam skews in the direction of right-handed downward, and in FIG. 6B, the laser beam skews in the direction of right-handed upward).

The CPU 8 measures the quantity and direction of the skew from the output of the sensors 80a and 80b. The quantity of the skew represents how many pixels is dislocated in a vertical scanning direction in one scanning beam. In this case, the CPU 8 simultaneously detects the skew direction representing whether a laser beam is dislocated right-handed upward as shown in FIG. 6B or right-handed downward as shown in FIG. 6A. The CPU 8 outputs the data of the direction of the skew to the multiplexer control circuit 4.

The CPU 8 also operates into how many blocks image data stored in the line memory 10 is to be divided based upon the quantity of the skew and instructs the register 2 to store reference dot clock values functioning as a measure to recognize the position of each block in a horizontal scanning direction. Division may be also even or uneven. For example, if the laser beam on the photoconductor belt 100 is skewed in a right-hand upward or downward direction in one scanning and as a result, and the laser beam is skewed by M lines (M: a positive number) in the vertical direction of the laser scanning direction, the image data of each line are divided to M+1 blocks. In this case, the CPU 8 generates M+1 reference dot clock count values before dividing.

In this embodiment in FIG. 4, the laser beam skews by +5 lines, and the image data is divided into 6 blocks every line. Each block has N(=3) dots or pixels where N is calculated by S/(M+1), S is number of dots per line.

The comparative register 2 has a START register for storing start position (left-handed end on the main scanning width) and 2NDCOMP, 3RDCOMP, 4THCOMP, 5THCOMP, 6THCOMP and END registers for storing the start positions of the blocks 2 to 6 in FIG. 4.

After power on or the quantity of the skew is measured if necessary, image data is written to the register for comparison 2.

Next, after image data sent from a host not shown is once stored in the memory 110 of a controller 11, processing such as image processing is applied to the image data according to an instruction from the host. Then the image data synchronized with a dot clock is output to the line memory 10 together with the dot clock CK0. The line memory 10 sequentially buffers image data according to a control signal from the line memory control circuit 5 in the gate array 1. At this time, the dot clock counter 7 counts the dot clock CK0 and outputs the result to the comparator circuit 6.

The comparator circuit 6 always compares a counted dot clock value with the counted value stored in the comparative register 2 (the START, 2NDCOMP, 3RDCOMP, 4THCOMP, 5THCOMP, 6THCOMP and END registers) and outputs the result to the multiplexer control circuit 4 when the value in the register 2 and the counted dot clock value are identical with each other.

The multiplexer control circuit 4 controls the multiplexer 9 based upon the result of the comparison output from the comparator circuit 6. The multiplexer 9 selects the image data block on each block of FIG. 4 from the line memory 10 and outputs the selected image data block to the buffer 12 and data selector 14, by switching image data every block in FIG. 4.

The buffer 12 is controlled by a buffer control circuit 15 and stores the image data block from the multiplexer 9 for outputting dot (pixel) data of the additional scanning lines L10 to L50 in FIG. 4.

The data selector 14 selects one of the output (image data block on the laser scanning beams L1, L2, L3 . . . ) from the multiplexer 9 and the output (dot data on the additional laser beam L10, L20, L30 . . . ) from the buffer 12 responsive to a control signal from the selector control circuit 13. The control signal from the selector control circuit 13 generates based on the comparison output of the comparator circuit 6.

The mask circuit 3 masks the data of the area except a scanning area between the main scanning width. The output of the mask circuit 3 is supplied to the laser unit 106.

In this embodiment in the line I in FIG. 4, the data selector 14 selects the net patterned dots data from the multiplexer 9 and dot data A', B', C', D', E' from the buffer 12. The dot data A', B', C', D', E is the same data A, B, C, D, E on the above line. The masking circuit 3 masks the outside of the area of printing paper of corrected image data and outputs the data to the exposing laser unit 106 in FIG. 2.

Figure 7:
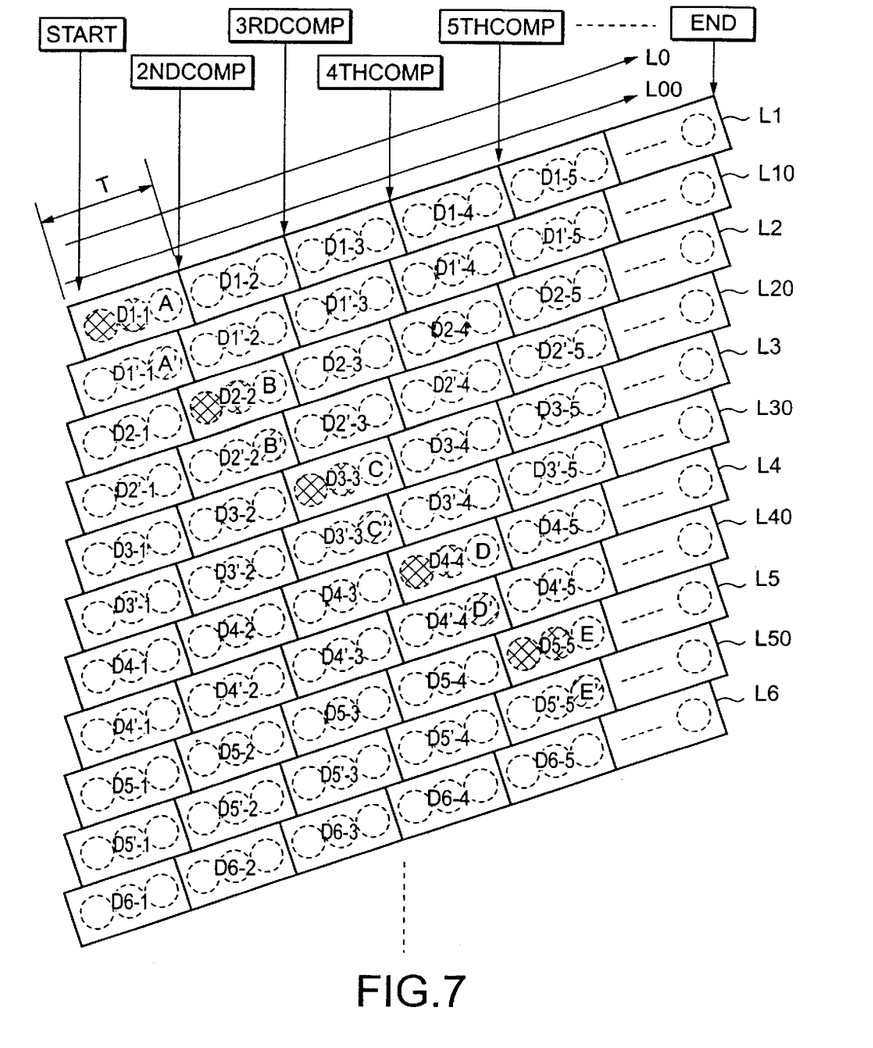
FIG. 7 is a diagram for explaining the performance of the image data correction circuit of FIG. 5.

FIG. 7 shows the principle of the image data correcting method of FIG. 4.

In FIG. 7, image data blocks D1-1, D1-2, D1-3, . . . are supplied for the laser beam L1, image data blocks D1'-1, D1'-2, D1'-3, . . . are supplied for the laser beam L10, image data blocks D2-1, D2-2, D2-3, . . . are supplied for the laser beam L2, image data blocks D2'-1, D2'-2, D2'-3, . . . are supplied for the laser beam L20, and so on. The image data blocks D1-1, D1-2, D1-3, . . . equal to the image data blocks D1'-1, D1'-2, D1'-3, . . . , and the image data blocks D2-1, D2-2, D2-3, . . . equal to the image data blocks D2'-1, D2'-2, D2'-3, . . . . This is because the image data blocks D1'-1, D1'-2, D1'-3, . . . are data from the buffer 12 which stores the image data blocks D1-1, D1-2, D1-3, . . . .

This embodiment of the present invention is featured by that the image data is outputted by generating scan lines, the number of which is twice that of the usual scan lines, to generate the additional scan of laser beam L10, L20, L30 . . . . In order to realize this, it is necessary to preliminarily perform an operation process such as doubling the scan speed of, for example, LD or making the rotation speed of the photo-conductor a half in the printer. In this embodiment, the scan speed of the LD is doubled with respect to the scan speed when the skew is not generated.

The control for every line will be described with reference to a procedure shown in FIG. 7.

(1) line L0 and L00

The line memory control circuit 5 writes the image data block "D1-1"~"D1-6" from the controller 11 (memory 110) in the line memory 10.

(2) lines L1 and L10:

The line memory control circuit 5 writes the image data block "D2-1"~"D2-6" in the line memory 10.

The line memory control circuit 5 reads "D1-1"~"D1-6" from the line memory 10.

When the count becomes equal to the count value stored in the "START" register of the comparative register 2, the dot clock counter 7 starts to count dot clocks and the multiplexer 9 selects and outputs "D1-1" and the buffer control circuit 15 stores the image data block "D1-1" as a dummy data "D1'-1" in the buffer 12.

Then, the data selector 14 selects the image data transmitted from the multiplexer 9 in response to the control signal from the selector control circuit 13.

When the count of the dot clock counter 7 becomes equal to "(the count value stored in the "2NDCOMP" register)–1", the buffer control circuit 15 derives a data (A'(=A) in FIG. 7) and outputs it to the data selector 14, and the data selector 14 selects and outputs the data A' from the buffer 12 according to the control signal from the selector control circuit 13.

The buffer control circuit 15 ends the output of the data A' of the buffer 12 when the count of the dot clock counter 7 becomes equal to the count value stored in the "2NDCOMP" register.

(3) lines L2 and L20:

"D3-1"~"D3-4" are written in the line memory 10 by the line memory control circuit 5.

"D2-1"~"D2-4" are read out from the line memory 10 to the multiplexer 9.

When the count of the dot clock counter 7 becomes equal to the count value stored in the "2NDCOMP" register, the multiplexer 9 selects and outputs "D2-2" and the buffer control circuit 15 stores the image data block "D2-2" as a dummy data "D2'-2" in the buffer 12.

The data selector 14 selects the image data transmitted from the multiplexer 9 according to the control signal from the selector control circuit 13.

When the count of the dot clock counter 7 becomes equal to "(the count value stored in the "3RDCOMP" register)–1", the buffer control circuit 15 derives a data (B' in FIG. 7) and outputs it to the data selector 14, and the data selector 14 selects and outputs the data B' from the buffer 12 according to the control signal from the selector control circuit 13.

The buffer control circuit 15 ends the output of the data B' of the buffer 12 when the count of the dot clock counter 7 becomes equal to the count value stored in the "3RDCOMP" register.

(4) line L3 and L30:

"D4-1"~"D4-4" are written in the line memory 10 by the line memory control circuit 5.

"D3-1"~"D3-4" are read out from the line memory 10.

When the count of the dot clock counter 7 becomes equal to the count value stored in the "3RDCOMP" register, the multiplexer 9 selects and outputs "D3-3" and the buffer control circuit 15 stores the image data block "D3-3" as a dummy data "D3'-3" in the buffer 12.

The data selector 14 selects the image data transmitted from the multiplexer 9 according to the control signal from the selector control circuit 13.

When the count of the dot clock counter 7 becomes equal to "(the count value stored in the "4THCOMP" register)–1", the buffer control circuit 15 derives a data (C' in FIG. 7) and outputs it to the data selector 14, and the data selector 14 selects and outputs the data C' from the buffer 12 according to the control signal from the selector control circuit 13.

The buffer control circuit 15 ends the output of the data C' of the buffer 12 when the count of the dot clock counter 7 becomes equal to the count value stored in the "4THCOMP" register.

(5) line L4 and L40:

"D5-1"~"D5-4" are written in the line memory 10.

"D4-1"~"D4-4" are read out from the line memory 10.

When the count of the dot clock counter 7 becomes equal to the count value stored in the "4THCOMP" register, the multiplexer 9 selects and outputs "D4-4" and the buffer control circuit 15 stores the image data block "D4-4" as a dummy data "D4'-4" in the buffer 12.

The data selector 14 selects the image data transmitted from the multiplexer 9 according to the control signal from the selector control circuit 13.

When the count of the dot clock counter 7 becomes equal to "(the count value stored in the "5THCOMP" register)–1", the buffer control circuit 15 derives a data (D' in FIG. 7) and outputs it to the data selector 14, and the data selector 14 selects and outputs the data D' from the buffer 12 according to the control signal from the selector control circuit 13.

The buffer control circuit 15 ends the output of the data D' of the buffer 12 when the count of the dot clock counter 7 becomes equal to the count value stored in the "5THCOMP" register.

The above process are performed to the line L6 and L60. When the count of the dot clock counter 7 becomes equal to the count value stored in the "END" register of the register 2, the image data of the line I from the data selector 14 are completed and then the mask circuit 3 masks the printing sheet except the area thereof.

Next, the image data output of the line I+1 are performed by the same control of the line I.

According to the image forming device of the embodiment of the present invention, it has a recording unit which records an image data line by line while scanning a recording medium (a photoconductor 100 in FIG. 2); a memory circuit (line memory 10 in FIG. 5) for storing an image data corresponding to a plurality of lines of the image data; an operation circuit (comparative circuit 2, comparator 6, multiplexer 9, and multiplexer control circuit 4) for dividing the image data stored in the memory circuit per line into blocks and generating an image data block having the number of pixels corresponding to an amount of skew with respect to a main scan line direction of the recording unit; and a control circuit (buffer 12 and buffer control circuit 15, data selector 14 and selector control circuit 13) for selecting pixel data from the image data block in corresponding two blocks of the adjacent two lines and combining the image data block and said pixel data to produce a line data having the image data block and the pixel data to be supplied to the recording unit.

It is possible to obtain the substantially straight line of image data, which is composed of the selected pixels synthesized, as shown in FIG. 5, so that it is possible to output a high quality image data having minimized tilting in the main scan direction.

In this embodiment, the laser beam unit is employed as the image data memory unit for forming the electrostatic latent image on the photo-conductor. However, the present invention can be applied to other electrophotographic printers of different systems. For example, the present invention can be applied to LED system in which an image data is outputted by using LED or liquid crystal shutter system in which an image data is outputted by using a liquid crystal shutter.

In a case where the circuit construction shown in FIG. 5 is realized by using a computer system including a CPU and a memory, the memory may construct the memory medium according to the present invention. The memory medium may store a program indicative of the procedure for executing the operation mentioned with respect to the described embodiment.

In this case, the memory medium storing the program executed by the computer executes the procedures of:

(1) storing an image data into a memory circuit line by line corresponding to a plurality of lines of the image data;

(2) dividing the image data stored in the memory circuit per line into blocks and generating an image data block having the number of pixels corresponding to an amount of skew with respect to a main scan line direction of a recording unit;

(3) selecting pixel data from the image data block in corresponding two blocks of the adjacent two lines; and (4) combining the image data block and the pixel data to produce a line data having the image data block and the pixel data to be supplied to the recording unit.

A semiconductor memory, an optical disc, a photo-magnetic disc, a magnetic recording medium, etc., may be used as the memory medium.

As described hereinbefore, according to the present invention, in which pixel data is selectively derived from two blocks of adjacent two lines so that the image data is corrected, it becomes possible to form an image data suitable for a high quality print having minimum step even when the image data recording unit is mounted in a tilted state with respect to the main scan direction. Further, since there is no need of precisely mount the image data recording unit compared with the conventional case, the present invention is effective in reducing the assembling steps of the printer.

What is claimed is:

1. An image forming device comprising:

a recording unit which records an image data line by line while scanning a recording medium with a laser;

a memory circuit for storing the image data corresponding to a plurality of lines of the image data;

an operation circuit for dividing the image data stored in said memory circuit per line into blocks and generating an image data block having the number of pixels corresponding to an amount of skew with respect to a main scan line direction of the laser from the recording unit; and a control circuit for selecting pixel data from the image data block in corresponding two blocks of the adjacent two lines and combining the image data block and said pixel data to produce a line data to be supplied to the recording unit.

2. The image forming device as claimed in claim 1, wherein a scan speed of said recording unit in the main scan line direction is twice that of a usual scan speed when the skew is not generated.

3. The image forming device as claimed in claim 1, wherein a relative scan speed of said recording unit and said recording medium in an additional scan line direction is a half of that of a usual case when the skew is not generated.

4. The image forming device as claimed in claim 1, wherein said recording unit has a laser beam irradiator and said recording medium is a photo-conductor scanned by the laser beam.

5. The image forming device as claimed in claim 1, further comprising circuit for measuring the amount of skew.

6. A recording medium storing a program executed by a computer for executing the procedures of:

storing an image data into a memory circuit line by line corresponding to a plurality of lines of the image data;

dividing the image data stored in said memory circuit per line into blocks and generating an image data block having the number of pixels corresponding to an amount of skew with respect to a main scan line direction of a recording unit;

selecting pixel data from the image data block in corresponding two blocks of the adjacent two lines; and combining the image data block and said pixel data to produce a line data to be supplied to the recording unit.

7. The recording medium as claimed in claim 6, wherein the program includes a program for executing a procedure of making a scan speed of said recording unit in the main scan direction twice that of a usual case when the skew is not generated.

8. The recording medium as claimed in claim 6, wherein the program includes a program for executing a procedure of making a relative speed of said recording unit and said recording medium in a sub scan direction a half of that of a usual case when the skew is not generated.

9. The recording medium as claimed in claim 6, wherein the program includes a program for executing a procedure of measuring a tilting amount of said recording unit in the main scan direction.

* * * * *